(12) United States Patent
Shannigrahi

(10) Patent No.: US 11,435,132 B2
(45) Date of Patent: Sep. 6, 2022

(54) METHOD FOR MANUFACTURING A VACUUM INSULATED STRUCTURE

(71) Applicant: WHIRLPOOL CORPORATION, Benton Harbor, MI (US)

(72) Inventor: Subrata Shannigrahi, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 291 days.

(21) Appl. No.: 16/875,973

(22) Filed: May 15, 2020

(65) Prior Publication Data

US 2021/0356197 A1    Nov. 18, 2021

(51) Int. Cl.
| | | |
|---|---|---|
| F16L 59/065 | (2006.01) | |
| F25D 23/06 | (2006.01) | |
| F25D 23/02 | (2006.01) | |

(52) U.S. Cl.
CPC .......... *F25D 23/065* (2013.01); *F16L 59/065* (2013.01); *F25D 23/028* (2013.01); *F25D 2201/14* (2013.01); *Y10T 428/231* (2015.01)

(58) Field of Classification Search
None
See application file for complete search history.

(56) References Cited

U.S. PATENT DOCUMENTS

| | | |
|---|---|---|
| 2,164,143 A | 6/1939 | Munters |
| 2,824,364 A | 2/1958 | Bovenkerk |
| 3,179,549 A | 4/1965 | Strong et al. |
| 4,745,015 A | 5/1988 | Cheng et al. |
| 5,009,218 A | 4/1991 | Bächli |
| 5,094,899 A | 3/1992 | Rusek, Jr. |
| 5,609,934 A | 3/1997 | Fay |
| 6,838,146 B2 | 1/2005 | Merrill et al. |
| 9,157,230 B2 | 10/2015 | Feinerman et al. |
| 2012/0285971 A1 | 11/2012 | Junge et al. |
| 2017/0190081 A1 | 7/2017 | Naik et al. |

FOREIGN PATENT DOCUMENTS

| | | |
|---|---|---|
| CN | 102241101 A | 11/2011 |
| CN | 104260264 A | 1/2015 |
| EP | 0645576 B1 | 3/1997 |
| GB | 726639 A | 3/1955 |
| JP | H04337195 A | 11/1992 |

*Primary Examiner* — Alexander S Thomas
(74) *Attorney, Agent, or Firm* — Price Heneveld LLP

(57) ABSTRACT

A method for manufacturing a vacuum insulated structure includes adhering a trim breaker to a wrapper and a liner via an adhesive to define an insulated structure. The insulated structure is positioned within an evacuation chamber proximate to a first heater and a second heater. The insulated structure and the evacuation chamber are heated via the first heater and the second heater. The evacuation chamber is evacuated via a first vacuum pump, and the insulated structure is evacuated via a second vacuum pump.

20 Claims, 8 Drawing Sheets

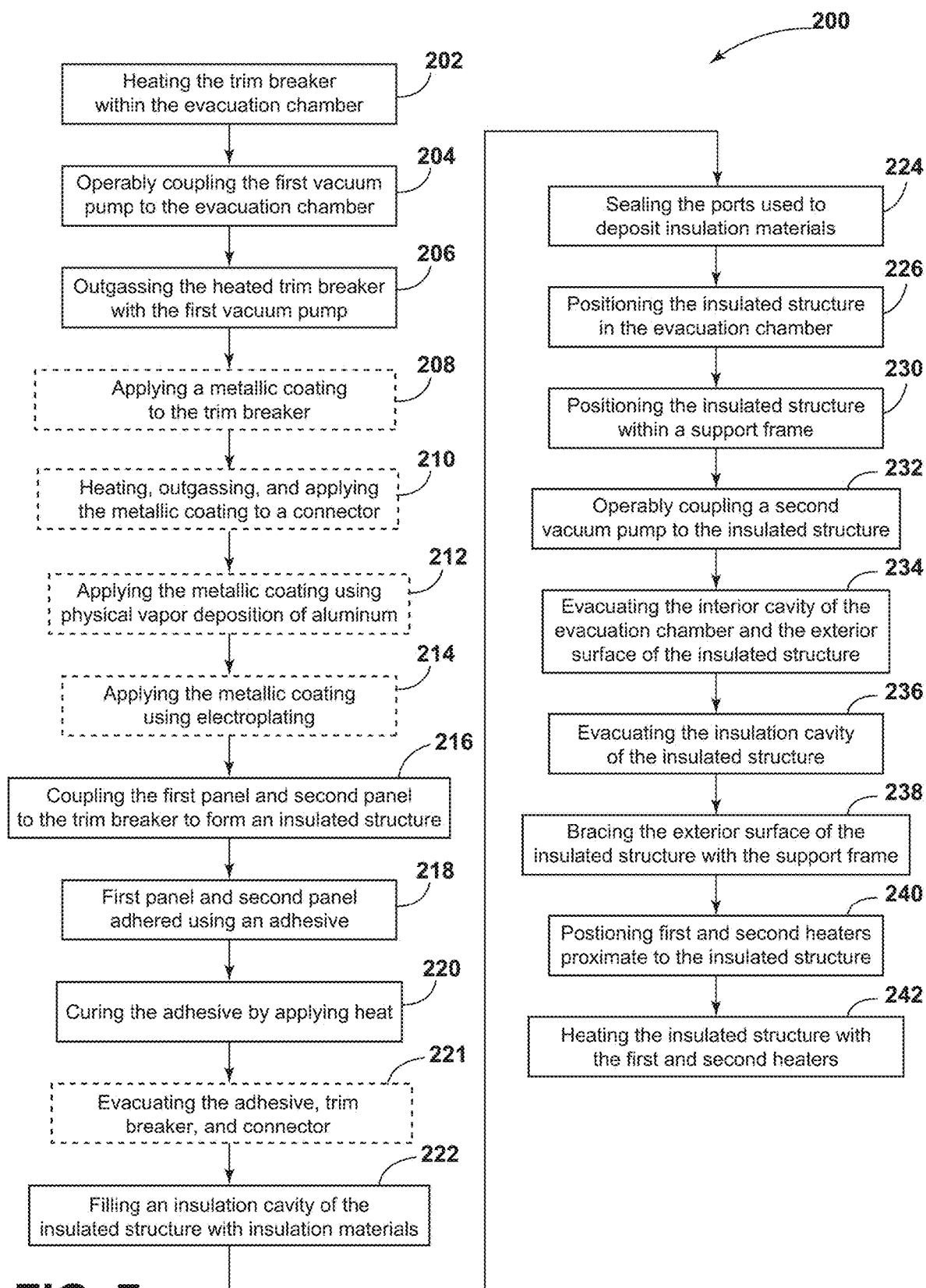

METHOD FOR MANUFACTURING A VACUUM INSULATED STRUCTURE

BACKGROUND OF THE DISCLOSURE

The present disclosure generally relates to a vacuum insulated structure, and more specifically, to a method for manufacturing the vacuum insulated structure.

SUMMARY OF THE DISCLOSURE

According to one aspect of the present disclosure, a method for manufacturing a vacuum insulated structure includes heating a trim breaker within an evacuation chamber. The heated trim breaker is outgassed via a first vacuum pump operably coupled to the evacuation chamber to define a vacuum within the evacuation chamber. A metallic coating is applied to the trim breaker. The trim breaker is adhered to a first panel and a second panel via an adhesive to define an insulated structure, and heat is applied to the insulated structure to cure the adhesive. The insulated structure is filled with insulation materials via ports, which are then sealed. The heated insulated structure is positioned within the evacuation chamber. The insulated structure is evacuated via the first vacuum pump, which is operably coupled to the evacuation chamber, and by a second vacuum pump, which is operably coupled to the insulated structure.

According to another aspect of the present disclosure, a method for manufacturing a vacuum insulated structure includes applying a metallic coating to a trim breaker. The trim breaker is adhered to a first panel and a second panel via an adhesive to define an insulated structure, and the adhesive is cured via heat. Insulation materials are disposed within an insulation cavity defined between the first panel and the second panel. The insulated structure is positioned in an evacuation chamber. The evacuation chamber is evacuated via a first pump, and the insulated structure is evacuated via a second pump.

According to yet another aspect of the present disclosure, a method for manufacturing a vacuum insulated structure includes adhering a trim breaker to a wrapper and a liner via an adhesive to define an insulated structure. The insulated structure is positioned within an evacuation chamber proximate to a first heater and a second heater. The insulated structure and the evacuation chamber are heated via the first heater and the second heater. The evacuation chamber is evacuated via a first vacuum pump, and the insulated structure is evacuated via a second vacuum pump.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 7 is a flow diagram of a method for forming a vacuum insulated structure of the present disclosure.

Figure 1:
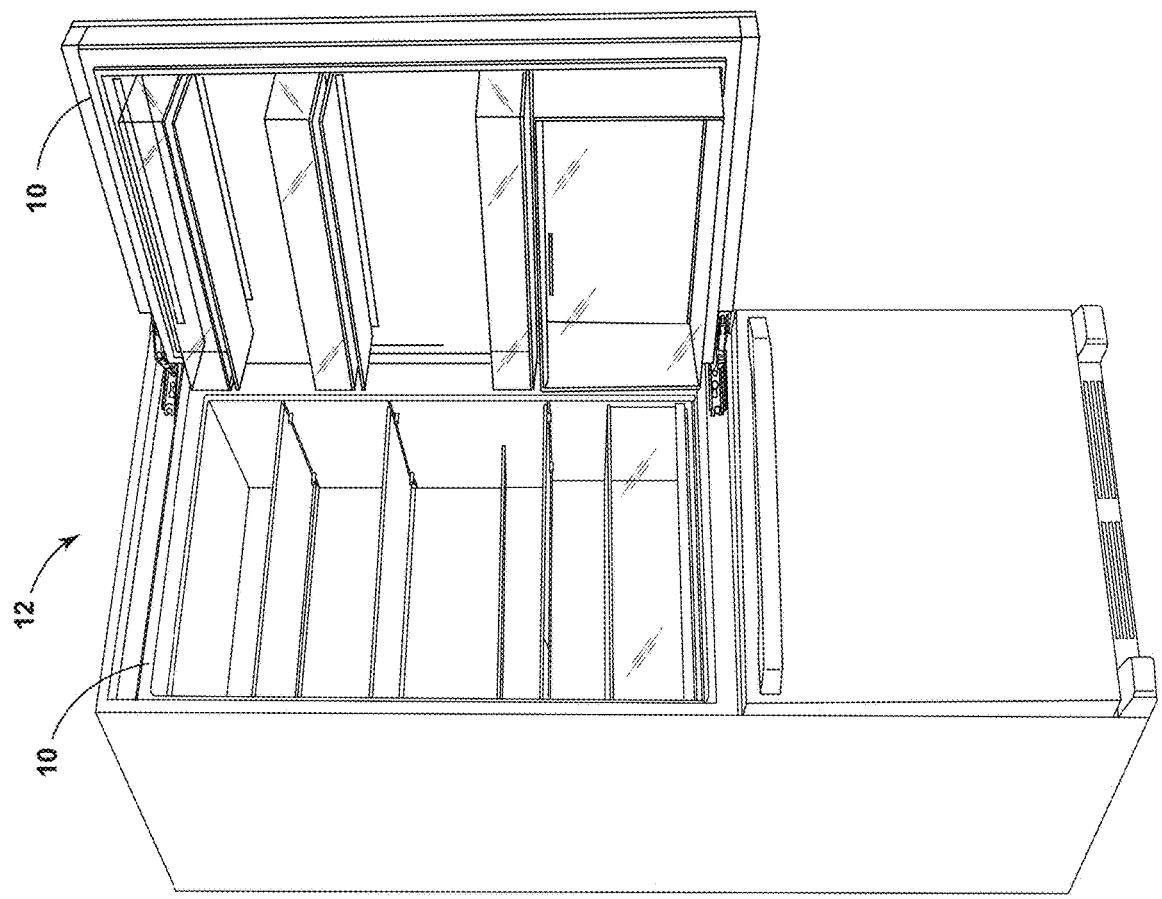
FIG. 1 is a front perspective view of an appliance of the present disclosure.
Figure 2:
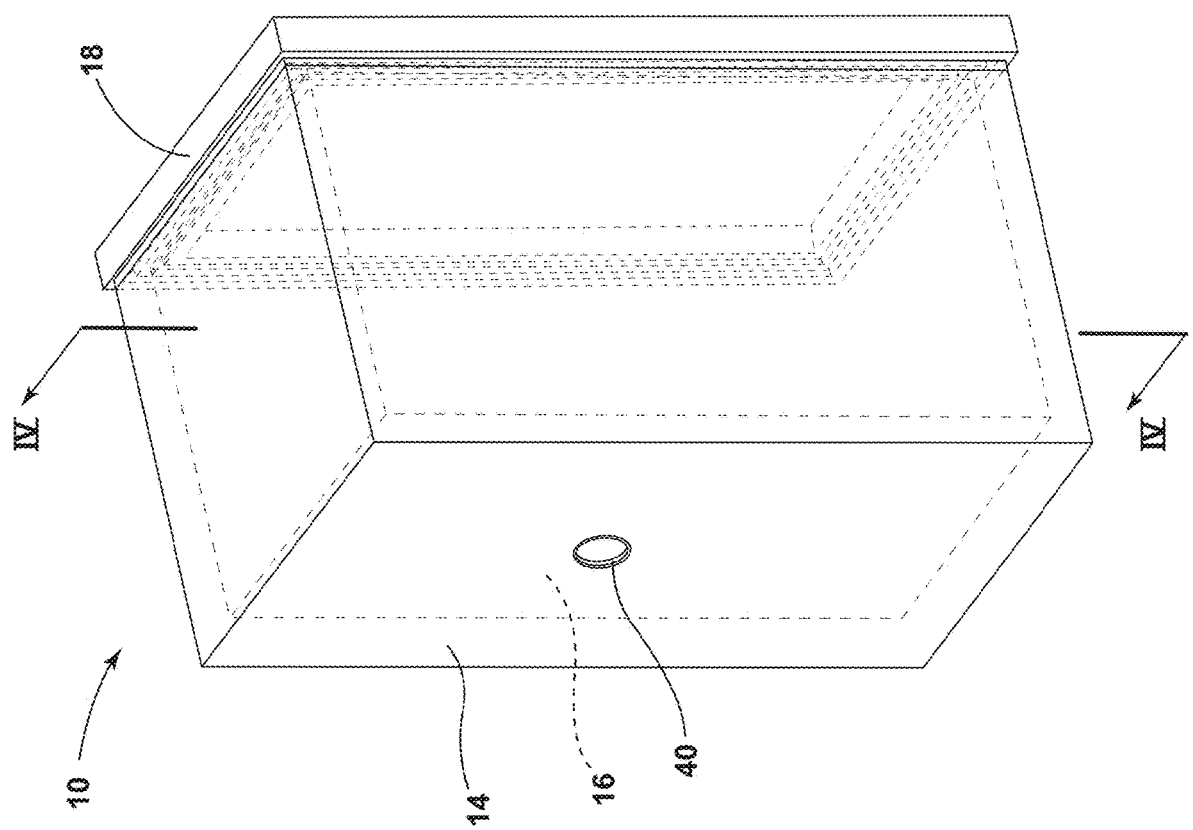
FIG. 2 is an expanded top perspective view of a vacuum insulated structure of the present disclosure.
Figure 3:
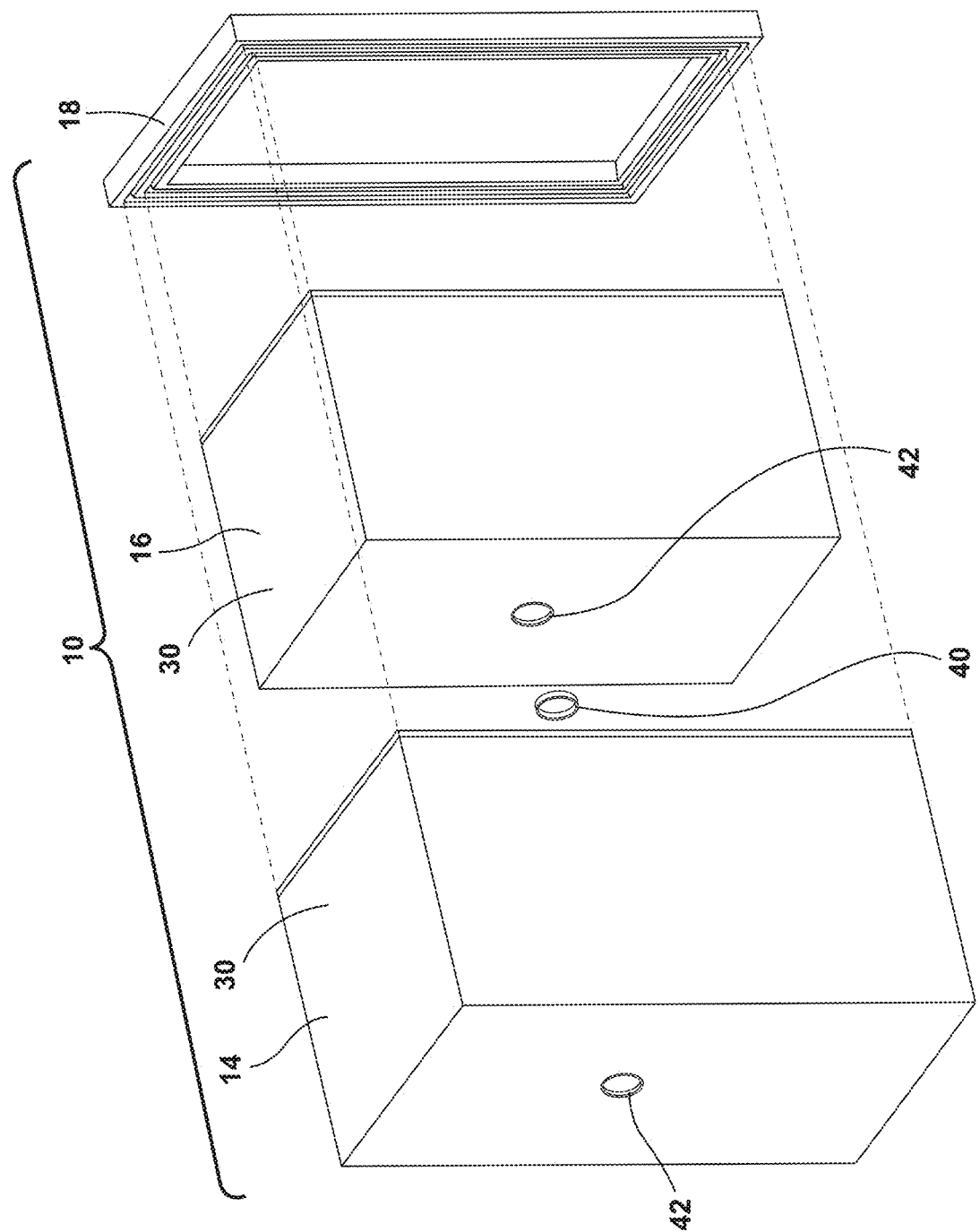
FIG. 3 is a top perspective view of a vacuum insulated structure of the present disclosure.

The components in the figures are not necessarily to scale, emphasis instead being placed upon illustrating the principles described herein.

DETAILED DESCRIPTION

The present illustrated embodiments reside primarily in combinations of method steps related to a method for manufacturing a vacuum insulated structure. Accordingly, the method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-7, reference numeral 10 generally designates a vacuum insulated structure for an appliance 12 that includes a first panel 14 coupled to a second panel 16 via a trim breaker 18. An insulation cavity 20 is defined between the first panel 14 and the second panel 16, such that insulation materials 22 may be dispensed within the insulation cavity 20. The vacuum insulated structure 10 is formed in an evacuation chamber 24 and is braced during evacuation of the evacuation chamber 24 by a support frame 26, described in more detail below.

Referring to FIGS. 1-4, the appliance 12 is illustrated as a refrigerating appliance, but it is also contemplated that the vacuum insulated structure 10 described herein may be used with a variety of appliances or insulation purposes other than within an appliance. Moreover, the vacuum insulated structure 10 may be in the form of a vacuum insulated structural cabinet or a vacuum insulated panel that may be used as an insulation member for the appliance 12. According to various examples, the vacuum insulated structure 10 includes the first panel 14 and the second panel 16, mentioned above, which may form a liner and a wrapper, respectively. The first panel 14 and the second panel 16 each have an interior surface 28 and an exterior surface 30, such that the interior surface 28 defines the insulation cavity 20 in which the insulation materials 22 are disposed. The first panel 14 and the second panel 16 are typically formed from a metallic material, which minimizes potential exposure of the insulation cavity 20 to air molecules.

It is generally contemplated that the insulation materials 22 may be a glass-type material, a carbon-based powder, silicon oxide-based materials, insulating gasses, and other standard insulation materials known in the art. The insulation materials 22 are disposed via a port 32 to substantially fill the insulation cavity 20 forming a substantially continuous layer between the first panel 14 and the second panel 16. Once the insulation cavity 20 is substantially filled, the port 32 is sealed to close the insulated structure 10 before evacuation, described in further detail below.

Figure 4:
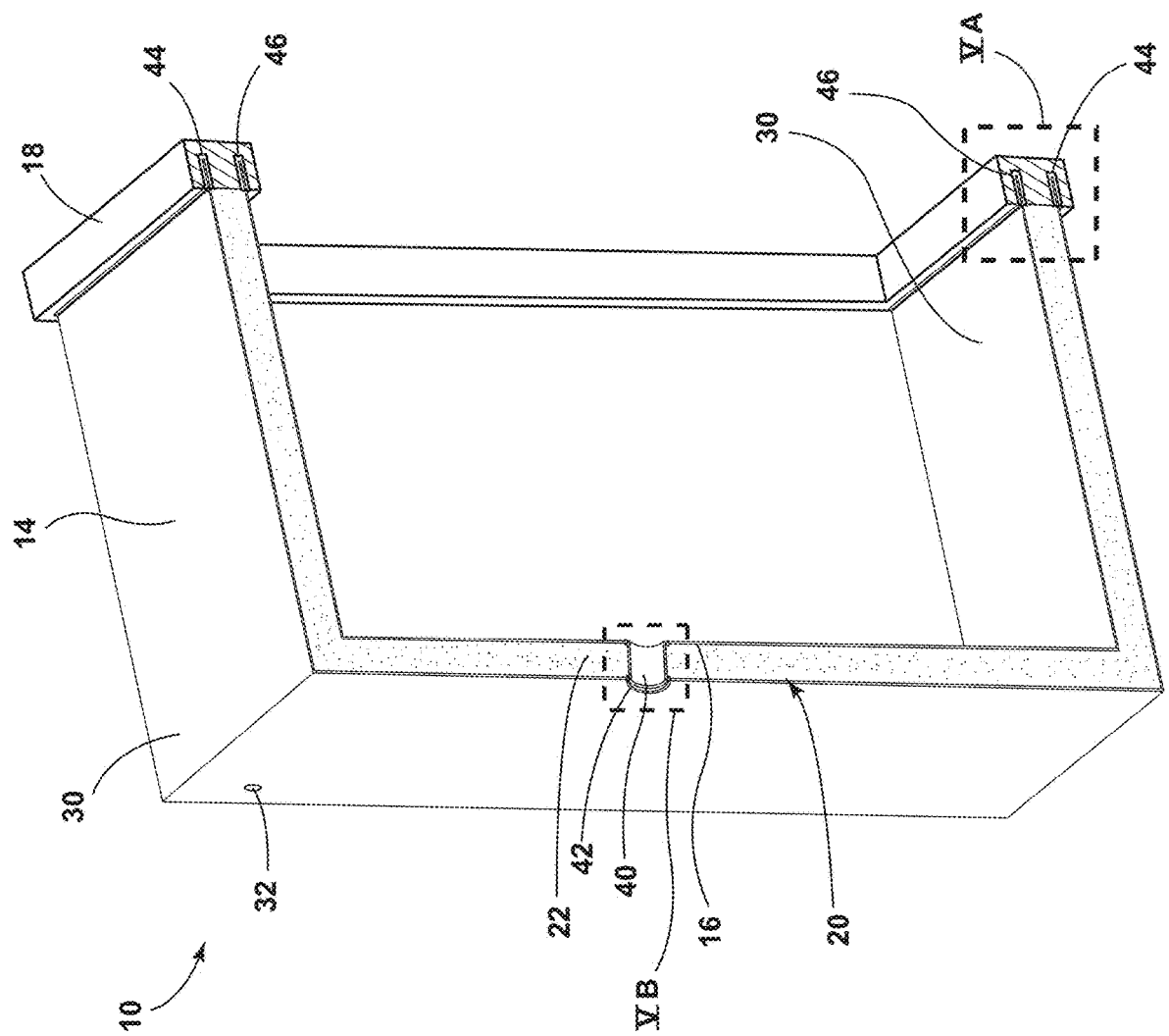
FIG. 4 is a cross-sectional view of the vacuum insulated structure of FIG. 2 taken along lines IV-IV.
Figure 5A:
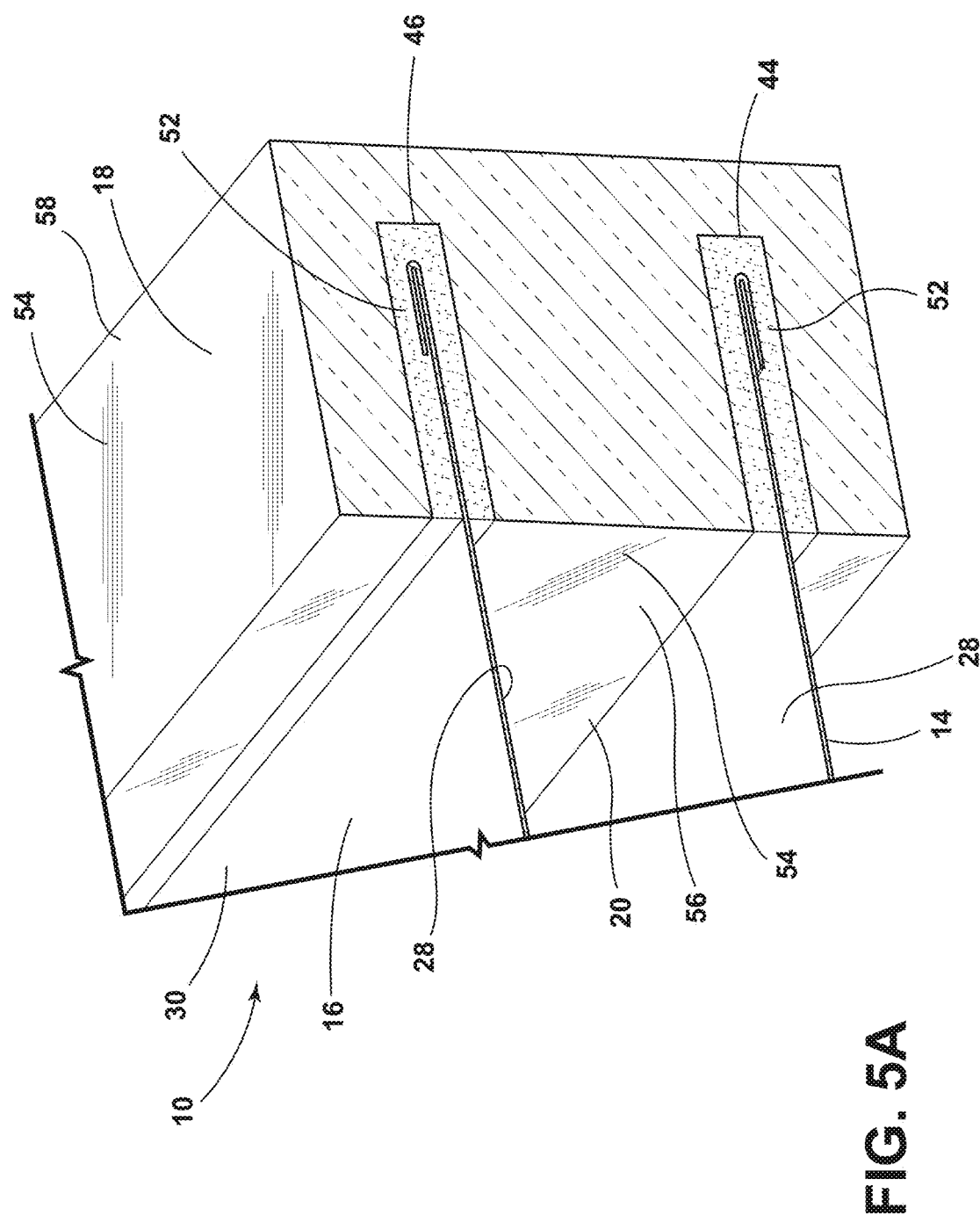
FIG. 5A is an enlarged cross-sectional view of a trim breaker of the vacuum insulated structure of FIG. 4 taken at area VA.
Figure 5B:
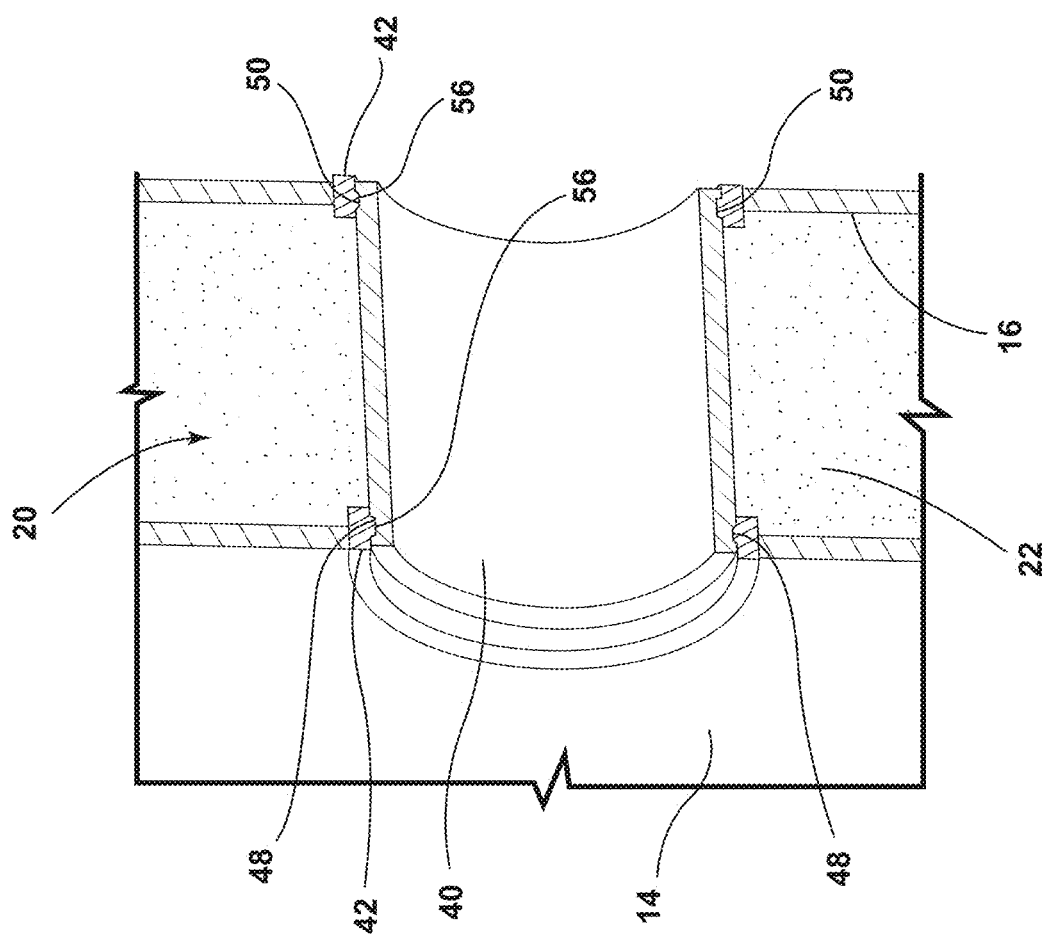
FIG. 5B is an enlarged cross-sectional view of a connector of the vacuum insulated structure of FIG. 4 taken at area VB.

Referring to FIGS. 2-5B, the insulation cavity 20 is further defined by the trim breaker 18, which couples the first panel 14 to the second panel 16, and a connector 40, which is disposed around an aperture 42 defined by each of the first panel 14 and the second panel 16. The connector 40 provides a space through which wiring and other tubing for the appliance 12 may pass. As illustrated in FIG. 5A, the first panel 14 is disposed within a first groove 44 of the trim breaker 18, and the second panel 16 is disposed within a second groove 46 of the trim breaker 18. In addition, the first panel 14 is disposed within a first circumferential groove 48 of the connector 40, and the second panel 16 is disposed within a second circumferential groove 50 of the connector 40, as illustrated in FIG. 5B. An adhesive 52 is disposed within each of the first groove 44, the second groove 46, the first circumferential groove 48, and the second circumferential groove 50 to securely couple the first panel 14 and the second panel 16, respectively, to the trim breaker 18 and the connector 40.

It is generally contemplated that the trim breaker 18 and the connector 40 are formed from a polymeric material, such as plastic. Conventional trim breakers and connectors are typically porous, such that, over time, air molecules can pass through conventional trim breakers and connectors into the insulation cavity 20. Accordingly, the trim breaker 18 and the connector 40 of the present disclosure are evacuated, described in further detail below, to remove the air molecules present. Moreover, a metallic coating 54 is applied to the evacuated trim breaker 18 and the evacuated connector 40 to minimize future penetration of air molecules into the insulation cavity 20. It is also contemplated that the metallic coating 54 may be applied regardless of whether the trim breaker 18 and the connector 40 are evacuated. The metallic coating 54 can trap potential air molecules present in the trim breaker 18 and the connector 40, such that future air permeation is minimized by the metallic coating 54.

Referring to FIGS. 3-5B, the metallic coating 54 seals the trim breaker 18 and the connector 40 from the pass-through of gasses into the insulation cavity 20. The metallic coating 54 can be formed from aluminum and can be applied to the trim breaker 18 and the connector 40 using physical vapor deposition. The metallic coating 54 can be applied to the trim breaker 18 and the connector 40 in a vapor phase under physical vapor deposition, which then condenses to form the film on the trim breaker 18 and the connector 40.

While the metallic coating 54 may be formed from an aluminum base, it is also contemplated that the metallic coating 54 can be chrome, titanium, or any other metal typically used in physical vapor deposition. Additionally or alternatively, the metallic coating 54 can be applied to the trim breaker 18 using electroplating methods. Electroplating is a process in which the trim breaker 18 and the connector 40 are plated with the metallic coating 54, which typically results in a thicker coating as compared to using physical vapor deposition. The use of metals to form the metallic coating 54 forms a barrier, such that potential entry of gasses into the insulated structure 10 is minimized.

With further reference to FIGS. 3-5B, the metallic coating 54 is applied under a vacuum to secure the metallic coating 54 to the trim breaker 18 and the connector 40, described in further detail below. The metallic coating 54 is applied to an inner channel 56 and an outer surface 58 of each of the trim breaker 18 and the connector 40. The application of the metallic coating 54 to both the inner channel 56 and the outer surface 58 further diminishes the rate of gas permeation into the insulated structure 10. Thus, the integrity of the insulated structure 10, whether the vacuum insulated structural cabinet or panel may be maintained, ultimately increases the useful life of the insulated structure 10. Thus, coating the trim breaker 18 and the connector 40 generally minimizes outgassing into the insulation cavity 20.

Figure 6:
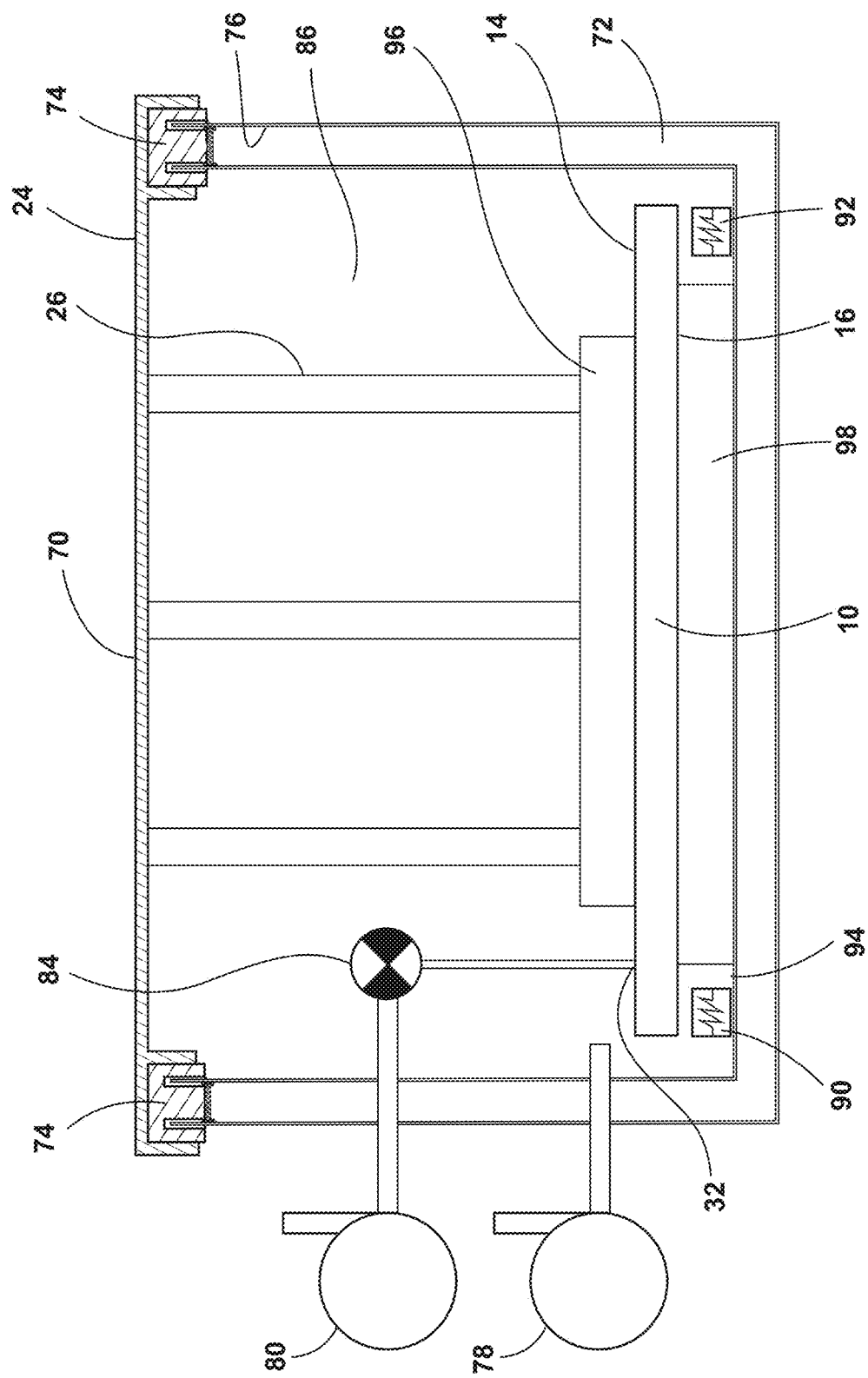
FIG. 6 is a cross-sectional view of an evacuation chamber of the present disclosure that includes a vacuum insulated structure disposed between a support frame.

Referring now to FIG. 6, the insulated structure 10, illustrated as an insulated panel, is disposed within the evacuation chamber 24 and is positioned between the support frame 26, described below. A lid 70 and a body 72 form the evacuation chamber 24 in which the insulated structure 10 is disposed. The lid 70 is sealed to the body 72 using a gasket 74 disposed along an upper portion 76 of the body 72. The lid 70 and the gasket 74 define a seal for the evacuation chamber 24, such that as a vacuum is drawn within the evacuation chamber 24, the vacuum defined within the evacuation chamber 24 is maintained. In order to draw the vacuum, it is generally contemplated that a first vacuum pump 78 and a second vacuum pump 80 are coupled to the body 72 of the evacuation chamber 24. The first vacuum pump 78 is configured to evacuate an interior cavity 82 of the evacuation chamber 24, such that the insulated structure 10 positioned within the evacuation chamber 24 is also evacuated within the interior cavity 82 of the evacuation chamber 24.

The second vacuum pump 80 extends through the body 72 of the evacuation chamber 24 and is coupled to the insulated structure 10 via a valve 84. The valve 84 is coupled to the port 32 of the insulated structure 10, such that the second vacuum pump 80 draws a vacuum within the insulation cavity 20 via the valve 84. Air present within the insulation cavity 20 is drawn out, or evacuated, as the second vacuum pump 80 draws the vacuum. It is generally contemplated that the first vacuum pump 78 and the second vacuum pump 80 can be activated simultaneously, such that the interior cavity 82 of the evacuation chamber 24 and the insulation cavity 20 of the insulated structure 10 are evacuated at approximately the same time.

Referring to FIGS. 4-6, first and second heaters 90, 92 may be positioned along a bottom surface 94 of the evacuation chamber 24. Additionally or alternatively, the first and second first and second heaters 90, 92 may be positioned along any surface within the evacuation chamber 24 proximate to the insulated structure 10. It is also contemplated that a single heater 90 may be used. The first and second heaters 90, 92 are adjusted to cure the adhesive 52 in order to adhere the first panel 14 and the second panel 16 to the trim breaker 18 and the connector 40 to form the insulated structure 10. The first and second heaters 90, 92 also increase the speed in which the insulated structure 10 is evacuated and the trim breaker 18 and the connector 40 are outgassed. For example, as the insulation materials 22 are heated by the first and second heaters 90, 92, the insulation materials 22 are typically more energized and, as a result, the air molecules are easier to remove from the insulation materials 22. Similarly, the air molecules present in the adhesive 52 are more rapidly removed as a result of the heat applied by the first and second heaters 90, 92.

Overall, the efficiency of the evacuation process is improved by keeping the insulated structure 10 at a high temperature using the first and second heaters 90, 92. By way of example, not limitation, the first and second heaters 90, 92 may generate a temperature of approximately 60-degrees to 65-degrees Celsius. However, temperatures within the range of 40-degrees to 49-degrees Celsius, 50-degrees to 59-degrees Celsius, as well as other temperature ranges are similarly contemplated. While higher temperatures increase overall efficiency, the first and second heaters 90, 92 are maintained at a high temperature, such as 65-degrees Celsius, which can also maintain the integrity of the adhesive 52 and the polymeric material that forms the trim breaker 18 and the connector 40.

While it is contemplated that the trim breaker 18 and the connector 40 can be outgassed under heated conditions prior to assembly of the insulated structure 10, it is also contemplated that the trim breaker 18 and the connector 40 are heated and outgassed after being assembled with the first panel 14 and the second panel 16. For example, the inner channels 56 and the outer surfaces 58 of both the trim breaker 18 and the connector 40 are evacuated via both the first vacuum pump 78 and the second vacuum pump 80, which is further expedited via the first and second heaters 90, 92.

The outer surfaces 58 of the trim breaker 18 and the connector 40 are typically evacuated more efficiently as a result of minimal resistance as compared to the potential interference with insulation materials 22 and the inner channels 56 of the trim breaker 18 and the connector 40. Thus, the overall efficiency of the evacuation process can be increased by heating and simultaneously evacuating the interior cavity 82 of the evacuation chamber 24 and the insulation cavity 20 of the insulated structure 10. In addition, the metallic coating 54 can be applied under the vacuum to seal the evacuated trim breaker 18 and connector 40. The metallic coating 54 is typically cured during the curing of the adhesive 52 by way of the heat from the first and second heaters 90, 92.

Referring still to FIGS. 4-6, the insulated structure 10 is braced by the support frame 26 as the interior cavity 82 of the evacuation chamber 24 is evacuated by the first vacuum pump 78. The support frame 26 includes a first frame portion 96 and a second frame portion 98 that stabilizes the insulated structure 10 as the interior cavity 82 is evacuated. The stabilization minimizes potential outward bowing of the insulated structure 10 as a result of the vacuum pressure generated by the first vacuum pump 78. The support frame 26 is configured to brace each side of the insulated structure 10, such that the first panel 14 and the second panel 16 are braced on the exterior surfaces 30. For example, the insulated structure 10 illustrated in FIG. 6 is an insulated panel braced between the first and second frame portions 96, 98, such that the first frame portion 96 braces the first panel 14 and the second frame portion 98 braces the second panel 16. The support frame 26 can also be configured to brace the insulated structure 10 when it is formed from the liner and wrapper, such that the first frame portion 96 and the second frame portion 98 can be formed to similarly correspond to each of the liner and the wrapper, respectively.

Referring to FIGS. 1-7, the method 200 for manufacturing the vacuum insulated structure 10 can begin with heating the trim breaker 18 within the evacuation chamber 24 (step 202). It will be understood that the steps of the method may be performed in any order, simultaneously, and/or omitted without departing from the teachings provided herein. Prior to outgassing the trim breaker 18, the first vacuum pump 78 is operably coupled to the evacuation chamber 24 to define the first vacuum pump 78 within the evacuation chamber 24 (step 204). Subsequently, the heated trim breaker 18 is outgassed using at least the first vacuum pump 78 (step 206). The metallic coating 54 can then be applied to the trim breaker 18 (step 208). A similar process is used when heating, outgassing, and applying the metallic coating 54 to the connector 40, which is generally described above (step 210). For example, the metallic coating 54 can be applied to the trim breaker 18 and the connector 40 using physical vapor deposition of aluminum (step 212). Additionally or alternatively, the metallic coating 54 can be applied by electroplating the trim breaker 18 and the connector 40 (step 214).

The first panel 14 and the second panel 16 are coupled to the trim breaker 18 to form the insulated structure 10 (step 216). As mentioned above, the first panel 14 and the second panel 16 are adhered to the trim breaker 18 using an adhesive 52 (step 218), which is cured by applying heat to the insulated structure 10 (step 220). Additionally or alternatively, the adhesive 52, the trim breaker 18, and the connector 40 may be evacuated while the adhesive 52 is being cured by the heat (step 221). The insulation cavity 20 is filled with insulation materials 22, described above, via the port 32 disposed on the first panel 14 and/or the second panel 16 (step 222). Once the insulation cavity 20 is filled, the port 32 is sealed (step 224). The insulated structure 10 is placed within the evacuation chamber 24 (step 226), which is operably coupled to the first vacuum pump 78. The insulated structure 10 is positioned within the support frame 26 between the first frame portion 96 and the second frame portion 98 within the evacuation chamber 24 (step 230). The second vacuum pump 80 is operably coupled to the insulated structure 10 (step 232) once the insulated structure 10 is positioned within the support frame 26. The first vacuum pump 78 evacuates the interior cavity 82 of the evacuation chamber 24 and the exterior surfaces 30 of the insulated structure 10 (step 234), and the second vacuum pump 80 evacuates the insulation cavity 20 of the insulated structure 10 (step 236).

During evacuation, the insulated structure 10 braces against the support frame 26 while the interior cavity 82 of the evacuation chamber 24 is evacuated by the first vacuum pump 78 (step 238). The first and second heaters 90, 92 are positioned proximate to the insulated structure 10 (step 240), such that the insulated structure 10 is heated by the first and second heaters 90, 92 to more efficiently outgas the insulated structure 10 (step 242).

Referring still to FIGS. 1-7, the insulation cavity 20 is defined by the metal of the first panel 14, the second panel 16, and the metallic coating 54. Accordingly, the metal of the first and second panels 14, 16 along with the metallic coating 54 on the trim breaker 18 form an envelope of materials that resist gas permeation. Further, the evacuation of the insulated structure 10 under the heat generated by the first and second heaters 90, 92 expedites the curing process of both the adhesive 52 and the metallic coating 54. Thus, the overall efficiency of forming the insulated structure 10 is increased and improved.

According to the various examples, the insulated structure 10 can be used in various appliances that can include, but are not limited to, refrigerators, freezers, coolers, ovens, dishwashers, laundry appliances, water heaters, and other similar appliances and fixtures within household and commercial settings. Additionally, the insulation materials 22 can be a free-flowing material that can be poured, blown, compacted, or otherwise disposed within the insulation cavity 20. This free-flowing material can be in the form of various silica-based materials, such as fumed silica, precipitated silica, nano-sized and/or micro-sided aerogel powder, rice husk ash powder, perlite, glass spheres, hollow glass spheres, cenospheres, diatomaceous earth, combinations thereof, and other similar insulating particulate material.

The invention disclosed herein is further summarized in the following paragraphs and is further characterized by combinations of any and all of the various aspects described therein.

According to one aspect of the present disclosure, a method for manufacturing a vacuum insulated structure includes heating a trim breaker within an evacuation chamber. The method further includes outgassing the heated trim breaker via a first vacuum pump that is operably coupled to the evacuation chamber to define a vacuum within the evacuation chamber. The method further includes applying a metallic coating to the trim breaker, adhering the trim breaker to a first panel and a second panel via an adhesive to define an insulated structure, applying heat to the insulated structure to cure the adhesive, filling the insulated structure with insulation materials via ports, sealing the ports, positioning the heated insulated structure in the evacuation chamber, and evacuating the insulated structure via the first vacuum pump that is operably coupled to the evacuation chamber and a second vacuum pump that is operably coupled to the insulated structure.

According to another aspect, evacuating a heated insulated structure includes evacuating an exterior surface of an insulated structure and an interior cavity of an evacuation chamber via a first vacuum pump.

According to another aspect, the method includes evacuating an insulation cavity of an insulated structure via a second vacuum pump.

According to another aspect, the method includes bracing an exterior surface of an insulated structure with a support frame.

According to another aspect, applying a metallic coating includes using physical vapor deposition of aluminum on a trim breaker.

According to another aspect, the method includes applying a metallic coating to a connector that is coupled to an aperture defined by each of a first panel and a second panel.

According to another aspect, evacuating an insulated structure includes applying additional heat to an insulated structure within an evacuation chamber.

According to another aspect of the present disclosure, a method for manufacturing a vacuum insulated structure includes applying a metallic coating to the trim breaker, adhering the trim breaker to a first panel and a second panel via an adhesive to define an insulated structure, curing the adhesive via heat, depositing insulation material within an insulation cavity defined between the first panel and the second panel, positioning the insulated structure in an evacuation chamber, evacuating the evacuation chamber via a first pump, and evacuating the insulated structure via a second pump.

According to another aspect, the method includes applying a metallic coating to an inner channel and an external surface of a trim breaker.

According to another aspect, the method includes evacuating a trim breaker via evacuation of an evacuation chamber via a first pump.

According to another aspect, the method includes bracing an exterior surface of an insulated structure with a support frame.

According to another aspect, the method includes outgassing a trim breaker via heat that is applied to an insulated structure.

According to another aspect, the method includes coupling a connector to an aperture that is defined by a first panel and a second panel. The method further includes applying a metallic coating to the connector.

According to yet another aspect of the present disclosure, a method for manufacturing a vacuum insulated structure includes adhering a trim breaker to a wrapper and a liner via an adhesive to define an insulated structure. The method further includes positioning the insulated structure within an evacuation chamber proximate to a first heater and a second heater. The method further includes heating the insulated structure and the evacuation chamber via the first heater and the second heater. The method further includes evacuating the evacuation chamber via a first vacuum pump, and evacuating the insulated structure via a second vacuum pump.

According to another aspect, the method includes outgassing a trim breaker via a first heater and a second heater.

According to another aspect, the method includes evacuating an external surface of a trim breaker via a first vacuum pump. The method further includes evacuating an internal channel of the trim breaker via a second vacuum pump.

According to another aspect, the method includes applying a metallic coating to a trim breaker.

According to another aspect, applying a metallic coating includes electroplating a trim breaker with the metallic coating.

According to another aspect, the method includes positioning a first heater and a second heater proximate to a trim breaker. The method further includes applying heat to the trim breaker via the first heater and the second heater.

According to another aspect, the method includes positioning an insulated structure within a support frame, and bracing the insulated structure via the support frame.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method for manufacturing a vacuum insulated structure, comprising:
    heating a trim breaker within an evacuation chamber;
    outgassing the heated trim breaker via a first vacuum pump operably coupled to the evacuation chamber to define a vacuum within the evacuation chamber;
    applying a metallic coating to the trim breaker;
    adhering the trim breaker to a first panel and a second panel via an adhesive to define an insulated structure;
    applying heat to the insulated structure to cure the adhesive;
    filling the insulated structure with insulation materials via ports;
    sealing the ports;
    positioning the heated insulated structure in the evacuation chamber; and
    evacuating the insulated structure via the first vacuum pump operably coupled to the evacuation chamber and a second vacuum pump operably coupled to the insulated structure.

2. The method of claim 1, wherein evacuating the heated insulated structure further comprises the step of:
    evacuating an exterior surface of the insulated structure and an interior cavity of the evacuation chamber via the first vacuum pump.

3. The method of claim 2, further comprising the step of:
    evacuating an insulation cavity of the insulated structure via the second vacuum pump.

4. The method of claim 3, further comprising the step of:
    bracing the exterior surface of the insulated structure with a support frame.

5. The method of claim 1, wherein applying the metallic coating further comprises the step of:
    using physical vapor deposition of aluminum on the trim breaker.

6. The method of claim 1, further comprising the step of:
    applying the metallic coating to a connector coupled to an aperture defined by each of the first panel and the second panel.

7. The method of claim 1, wherein evacuating the insulated structure further comprises the step of:
    applying additional heat to the insulated structure within the evacuation chamber.

8. A method for manufacturing a vacuum insulated structure, comprising:
    applying a metallic coating to a trim breaker;
    adhering the trim breaker to a first panel and a second panel via an adhesive to define an insulated structure;
    curing the adhesive via heat;
    depositing insulation materials within an insulation cavity defined between the first panel and the second panel;
    positioning the insulated structure in an evacuation chamber;
    evacuating the evacuation chamber via a first pump; and
    evacuating the insulated structure via a second pump.

9. The method of claim 8, further comprising the step of:
    applying the metallic coating to an inner channel and an external surface of the trim breaker.

10. The method of claim 8, wherein the step of curing the adhesive further includes the step of:
    evacuating the trim breaker via evacuation of the evacuation chamber via the first pump.

11. The method of claim 8, further comprising the step of:
    bracing an exterior surface of the insulated structure with a support frame.

12. The method of claim 8, further comprising the step of:
    outgassing the trim breaker via heat applied to the insulated structure.

13. The method of claim 8, further comprising the steps of:
    coupling a connector to an aperture defined by the first panel and the second panel; and
    applying the metallic coating to the connector.

14. A method for manufacturing a vacuum insulated structure, comprising:
    adhering a trim breaker to a wrapper and a liner via an adhesive to define an insulated structure;
    positioning the insulated structure within an evacuation chamber proximate to a first heater and a second heater;
    heating the insulated structure and the evacuation chamber via the first heater and the second heater;
    evacuating the evacuation chamber via a first vacuum pump; and
    evacuating the insulated structure via a second vacuum pump.

15. The method of claim 14, wherein further comprising the step of:
    outgassing the trim breaker via the first heater and the second heater.

16. The method of claim 15, wherein further comprising the steps of:
    evacuating an external surface of the trim breaker via the first vacuum pump; and
    evacuating an internal channel of the trim breaker via the second vacuum pump.

17. The method of claim 14, further comprising the step of:
    applying a metallic coating to the trim breaker.

18. The method of claim 17, wherein applying the metallic coating further comprises the step of:

electroplating the trim breaker with the metallic coating.

19. The method of claim 14, wherein further comprising the steps of:

positioning the first heater and the second heater proximate to the trim breaker; and applying heat to the trim breaker via the first heater and the second heater.

20. The method of claim 14, wherein further comprising the steps of:

positioning the insulated structure within a support frame; and bracing the insulated structure via the support frame.

* * * * *